(12) United States Patent
Ho et al.

(10) Patent No.: US 10,681,281 B2
(45) Date of Patent: Jun. 9, 2020

(54) MOBILE DEVICE, AND IMAGE PROCESSING METHOD FOR MOBILE DEVICE

(71) Applicant: HTC Corporation, Taoyuan (TW)

(72) Inventors: Chia-Chu Ho, Taoyuan (TW); Chih-Hung Li, Taoyuan (TW); Ching-Hao Lee, Taoyuan (TW)

(73) Assignee: HTC Corporation, Taoyuan (TW)

(*) Notice: Subject to any disclaimer, the term of this patent is extended or adjusted under 35 U.S.C. 154(b) by 15 days.

(21) Appl. No.: 16/114,219

(22) Filed: Aug. 28, 2018

(65) Prior Publication Data
US 2019/0208133 A1    Jul. 4, 2019

Related U.S. Application Data

(60) Provisional application No. 62/610,936, filed on Dec. 28, 2017.

(51) Int. Cl.
| | |
|---|---|
| *H04N 5/232* | (2006.01) |
| *H04N 5/225* | (2006.01) |
| *H04N 7/14* | (2006.01) |
| *G09G 3/32* | (2016.01) |
| *G09G 3/3208* | (2016.01) |

(Continued)

(52) U.S. Cl.
CPC ......... *H04N 5/232933* (2018.08); *G09G 3/32* (2013.01); *H04N 5/2257* (2013.01); *H04N 7/144* (2013.01); *H04N 5/2254* (2013.01); *H04N 2007/145* (2013.01)

(58) Field of Classification Search
CPC ........... H04N 5/232933; H04N 5/2257; H04N 7/144; H04N 2007/145; H04M 1/026; G09G 2300/023
See application file for complete search history.

(56) References Cited

U.S. PATENT DOCUMENTS

| | | | |
|---|---|---|---|
| 2009/0009628 A1* | 1/2009 | Janicek | H04N 5/232 348/231.99 |
| 2017/0084231 A1* | 3/2017 | Chew | G06F 1/1626 |
| 2017/0124933 A1* | 5/2017 | Evans, V | G06F 3/005 |

FOREIGN PATENT DOCUMENTS

| | | |
|---|---|---|
| CN | 105094724 A | 11/2015 |
| TW | 201727307 A | 8/2017 |
| TW | 201727456 A | 8/2017 |

OTHER PUBLICATIONS

Corresponding Taiwan office action dated Nov. 14, 2019.

* cited by examiner

*Primary Examiner* — Ahmed A Berhan
(74) *Attorney, Agent, or Firm* — CKC & Partners Co., LLC (57) ABSTRACT

A mobile device includes a see-through display unit, a back cover, a first optical unit and a processing unit. The first optical unit is arranged between the see-through display unit and the back cover, and is configured to capture a first optical result along a first optical path, which passing through an active region of the see-through display unit. The processing unit is coupled to the first optical unit and the see-through display unit. The processing unit is configured to determine a first portion on the see-through display unit according to the first optical path in response to the first optical unit is triggered to capture the first optical result, and control the first portion of the see-through display unit to be transparent while capturing the first optical detection result or adjusting the first optical detection result according to display contents within the first portion on the see-through display unit.

15 Claims, 8 Drawing Sheets

(51) Int. Cl.
*G09G 5/00* (2006.01)
*H04M 1/02* (2006.01)
*H04M 1/725* (2006.01)

MOBILE DEVICE, AND IMAGE PROCESSING METHOD FOR MOBILE DEVICE

CROSS-REFERENCE TO RELATED APPLICATION

This application claims priority to U.S. Provisional Application Ser. No. 62/610,936, filed on Dec. 28, 2017, which is herein incorporated by reference.

BACKGROUND

Technical Field

The present disclosure relates to a mobile device and an image processing method. More particularly, the present disclosure relates to a mobile device with an optical unit and an image processing method suitable for a mobile device.

Description of Related Art

Nowadays, people always purse narrowing down borders of mobile devices.

However, optical elements such as ambient light sensor, structure light receiver, proximity sensor and front lens need to be arranged in the borders of the mobile devices to make the optical elements work properly, resulting in wider borders.

Therefore, how to arrange those optical elements in the devices and at the same time to narrow down the borders of the mobile devices are still challenging.

SUMMARY

One aspect of the present disclosure is related to a mobile device. In accordance with one embodiment of the present disclosure, the mobile device includes a see-through display unit, a back cover, a first optical unit and a processing unit. The first optical unit is arranged between the see-through display unit and the back cover, and is configured to capture a first optical result along a first optical path, which passing through an active region of the see-through display unit. The processing unit is coupled to the first optical unit and the see-through display unit. The processing unit is configured to determine a first portion on the see-through display unit according to the first optical path in response to the first optical unit is triggered to capture the first optical result, and control the first portion of the see-through display unit to be transparent while capturing the first optical detection result or adjusting the first optical detection result according to display contents within the first portion on the see-through display unit.

Another aspect of the present disclosure is related to an image processing method, suitable for a mobile device comprising a see-through display unit and a first optical unit arranged behind the see-through display unit and configured to generate a first optical detection result along a first optical path through the see-through display unit. The image processing method includes extracting a first portion of display contents on the see-through display unit when the first optical unit captures the first optical detection result; forming a first processed optical detection result by processing the first optical detection result with the first portion of the display contents displayed on the see-through display unit; and inputting the first processed optical detection result to an application corresponding to the first optical unit.

Another aspect of the present disclosure is related to an image processing method, suitable for a mobile device comprising a see-through display unit and a first optical unit arranged behind the see-through display unit and configured to generate a first optical detection result along a first optical path through the see-through display unit. The image processing method includes displaying display contents on the see-through display unit; in response to the first optical unit is triggered to capture the first optical result, determining a first portion on the see-through display unit according to the first optical path; and controlling the first portion of the see-through display unit to be transparent while capturing the first optical detection result.

Through the operations of the embodiments described above, the mobile device can generate images, light strength, and other optical detection results without affecting by the display contents on the see-through display unit.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating directions are used for illustration and do not limit the present disclosure.

One embodiment of the present disclosure is related to a mobile device including some optical elements, in which the optical elements include ambient light sensor, structure light transmitter, structure light receiver, proximity sensor and front lens. In the paragraphs below, a smart phone will be taken as an example to describe details of the mobile device. However, another mobile device, such as a tablet computer or a camera, is within the contemplated scope of the present disclosure.

Figure 1:
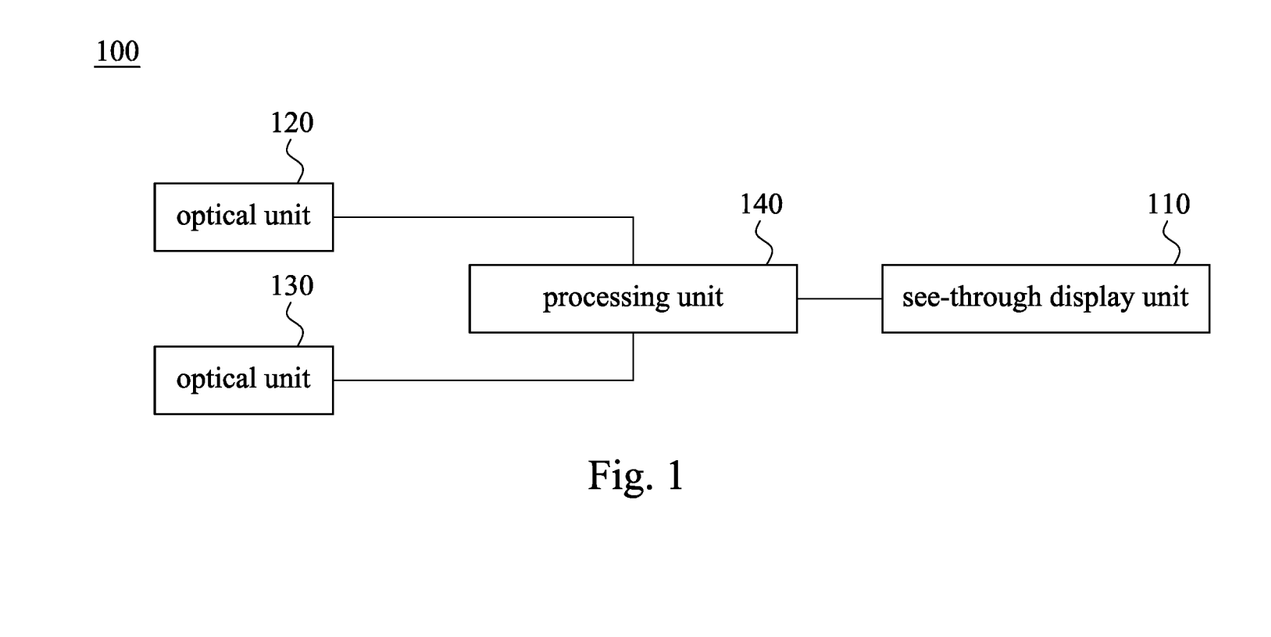
FIG. 1 is a schematic block diagram of a mobile device in accordance with one embodiment of the present disclosure.

FIG. 1 is a schematic block diagram of a mobile device 100 in accordance with one embodiment of the present disclosure. As shown in FIG. 1, the mobile device 100 includes an optical unit 120, an optical unit 130, a processing unit 140 and a see-through display unit 110. In this embodiment, the processing unit 140 is electrically connected to the optical unit 120, the optical unit 130 and the processing unit 140.

In some embodiments, the optical unit 120 and the optical unit 130 are each configured to generate light and receive light in order to capture an image. In some embodiments, the optical unit 120 and the optical unit 130 can, but not limited to, be realized by ambient light sensor, structure light transmitter, structure light receiver, proximity sensor and front lens.

As shown in FIG. 1, the mobile device 100 only includes two optical units, the optical unit 120 and the optical unit 130. However, any number of optical unit is within the contemplated scope of the present disclosure.

In some embodiments, the see-through display unit 110 is configured to display the image captured by the optical unit 120 or the optical unit 130, or display images generated by other applications. In some embodiments, the see-through display unit 110 can, but not limited to, be realized by a transparent light emitting diode (LED) screen or a transparent organic light emitting diode (OLED) screen. Various screens display with chromatic colors and being transparent when not displaying are within the contemplated scope of the present disclosure.

In some embodiments, the processing unit 140 is configured to process the image captured by the optical unit 120 or the optical unit 130 and transmit the processed image to an application corresponding to the optical unit 120 or an application corresponding to the optical unit 130. In some embodiments, the processing unit 140 can be realized by, for example, one or more processors, such as central processors and/or microprocessors, but are not limited in this regard.

In one embodiment, the mobile device 100 further includes a memory unit (not shown). The memory unit (not shown) is configured to store the image captured by the optical unit 120 or the optical unit 130 and to provide the image to the processing unit 140. In one embodiment, the memory unit (not shown) can be realized by, for example, a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art is within the contemplated scope of the present disclosure.

In summary, the mobile device 100 can generate a processed image with adaptive image effect according to the dynamic dimension of the target object. As a result, the adjustment level of the image effect can be adjusted quickly and intuitively with the distance between the target object and the mobile device 100, such that a user can adjust the adjustment level of the image effect applied on the captured image by moving the mobile device 100 without using any additional user interface. In addition, the applied portion (e.g., the foreground portion or the background portion) of the captured image can also be adjusted by moving the mobile device 100.

Figure 2A:
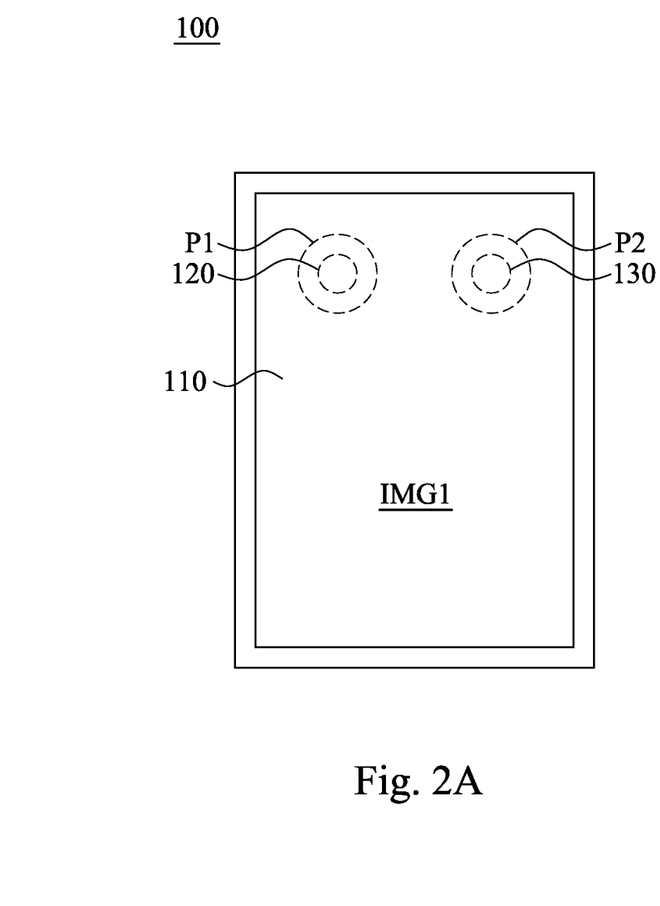
FIG. 2A is a front view of a mobile device, in accordance with one embodiment of the present disclosure.
Figure 2B:
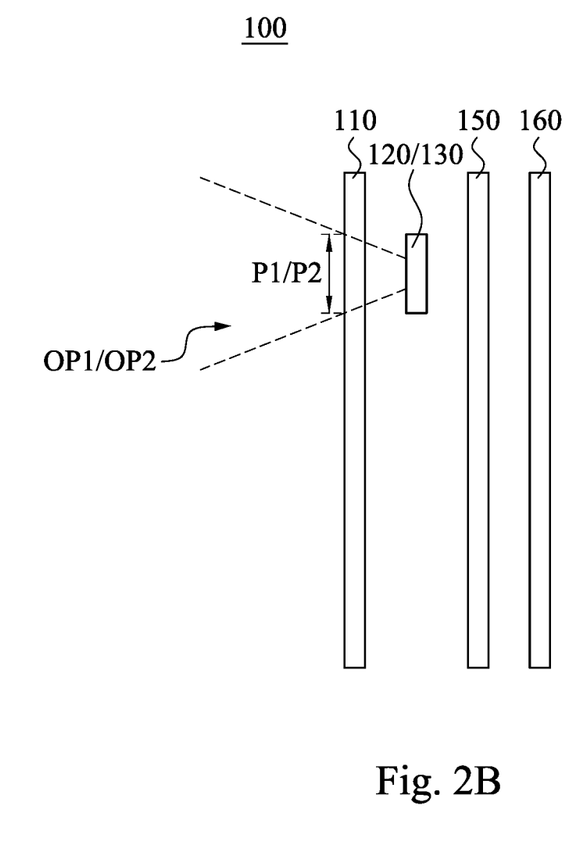
FIG. 2B is a side view of a mobile device, in accordance with one embodiment of the present disclosure.

Reference is made to FIG. 2A and FIG. 2B. FIG. 2A is a front view of a mobile device 100, in accordance with one embodiment of the present disclosure. FIG. 2B is a side view of a mobile device 100, in accordance with one embodiment of the present disclosure. As shown in FIG. 2A and FIG. 2B, the mobile device 100 includes the see-through display unit 110, the optical units 120 and 130, a printed circuit board (PCB) 150 and a back cover 160, in which the see-through display unit 110, the optical unit 120/130, the PCB 150 and the back cover 160 are arranged in order from the left of FIG. 2B to the right of FIG. 2B.

In some embodiments, the optical unit 120 and the optical unit 130 are arranged under the see-through display unit 110, more precisely, the optical unit 120 or the optical unit 130 are arranged between the see-through display unit 110 and the PCB 150, and are arranged between the see-through display unit 110 and a battery, in which the battery is arranged on the same layer as the PCB 150 (shown in FIG. 2B).

As shown in FIGS. 2A and 2B, the optical units 120 and 130 each captures an optical result along an optical path OP1/OP2, in which the optical path OP1/OP2 forms a portion P1/P2 (as shown in FIGS. 2A and 2B) on the see-through display unit 110 which displays display contents IMG1.

Figure 3:
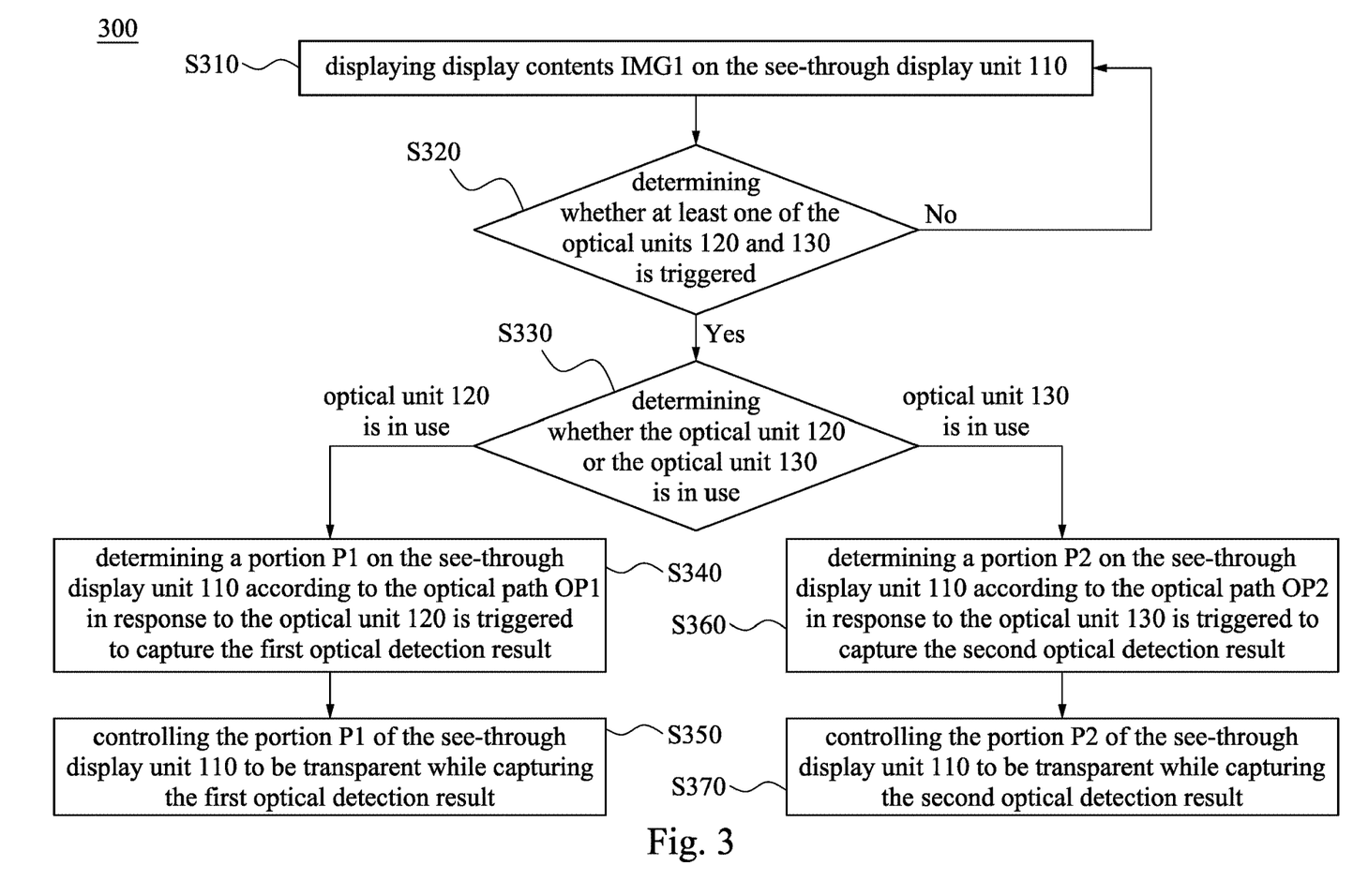
FIG. 3 is a flowchart of an image processing method of the mobile device in FIG. 1, in accordance with one embodiment of the present disclosure.

Details of the present disclosure are described in the paragraphs below with reference to an image processing method in FIG. 3, in which FIG. 3 is a flowchart of an image processing method 300 of the mobile device 100 in FIG. 1, in accordance with one embodiment of the present disclosure. However, the present disclosure is not limited to the embodiment below.

It should be noted that the image processing method 300 can be applied to a mobile device having a structure that is the same as or similar to the structure of the mobile device 100 shown in FIG. 1. To simplify the description below, the embodiment shown in FIG. 1 will be used as an example to describe the image processing method according to an embodiment of the present disclosure. However, the present disclosure is not limited to application to the embodiment shown in FIG. 1.

It should be noted that, in some embodiments, the image processing method 300 may be implemented as a computer program. When the computer program is executed by a computer, an electronic device, or the processing unit 140 in FIG. 1, this executing device performs the image processing method 300.

In addition, it should be noted that in the operations of the following image processing method 300, no particular sequence is required unless otherwise specified. Moreover, the following operations also may be performed simultaneously or the execution times thereof may at least partially overlap. Furthermore, the operations of the following image processing method 300 may be added to, replaced, and/or eliminated as appropriate, in accordance with various embodiments of the present disclosure.

Figure 4A:
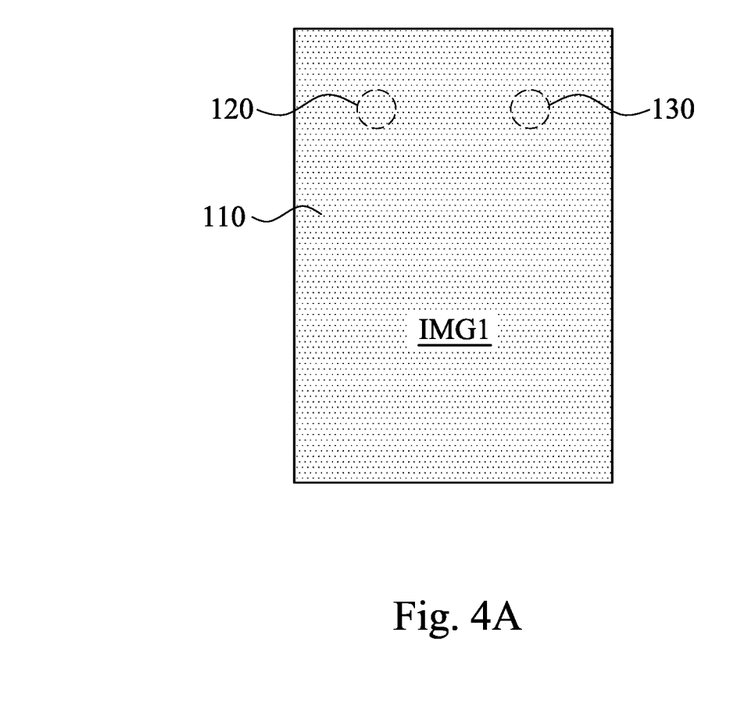
FIGS. 4A and 4B are schematic diagrams illustrating the image processing method in FIG. 3 in a demonstrational example.
Figure 4B:
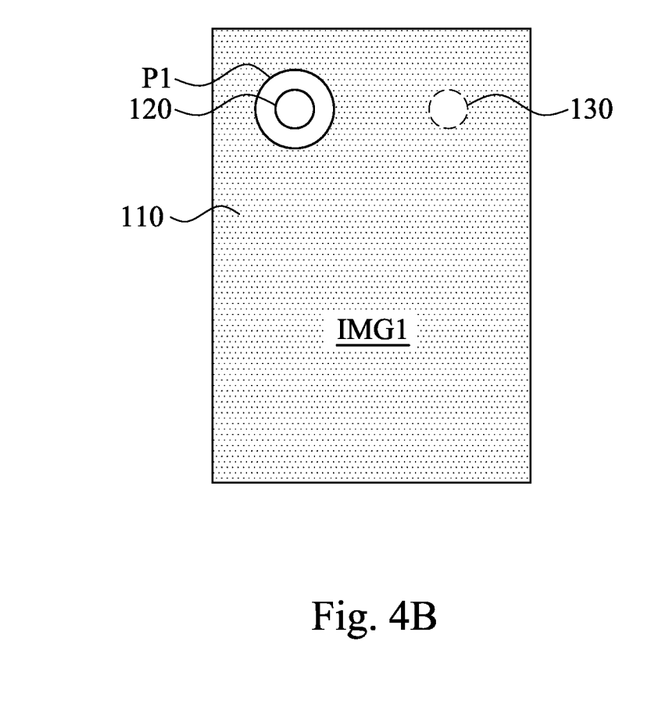

Reference is made to FIGS. 1, 3, 4A and 4B, in which FIGS. 4A and 4B are schematic diagrams illustrating the image processing method 300 in FIG. 3 in a demonstrational example. In the following embodiment, the optical unit 120 is assumed as a camera unit, and the optical unit 130 is assumed as a proximity sensor. The image processing method 300 includes the operations below.

In operation S310, the see-through display unit 110 displays display contents IMG1. As shown in FIG. 4A, the optical units 120 and 130 are invisible at this time.

In operation S320, the processing unit 140 determines whether at least one of the optical units 120 and 130 is triggered. In this embodiment, the processing unit 140 monitors an operational status of the mobile device 100, in which the operational status indicating whether the optical unit 120/130 is triggered to capture an optical detection result, for example, the operational status is indicating that the optical unit 120 is triggered to capture an image or indicating that the optical unit 130 is triggered to detect a light strength for proximity measurement. If the processing unit 140 determines that at least one of the optical units 120 and 130 is triggered to capture the optical detection result (i.e., the determination of operation S320 is "Yes"), operation S330 is executed. If the processing unit 140 determines that both the optical units 120 and 130 are not triggered (i.e., the determination of operation S320 is "No"), operation S310 is executed again to continue displaying the display contents IMG1 (as shown in FIG. 4A).

In operation S330, the processing unit 140 determines whether the optical unit 120 or the optical unit 130 is in use. If the processing unit 140 determines that the optical unit 120 is in use, operation S340 is executed. If the processing unit 140 determines that the optical unit 130 is in use, operation S360 is executed. If both the optical units 120 and 130 are in use, operation S340 and operation S360 are executed simultaneously.

In operation S340, the processing unit 140 determines a portion P1 on the see-through display unit 110 according to the optical path OP1 (as shown in FIG. 2B) in response to the optical unit 120 is triggered to capture the first optical detection result (e.g., an image). In some embodiments, the processing unit 140 determines a region R1 (not shown) on the see-through display unit 110 according to the portion P1 in response to the optical unit 120 is triggered to capture the first optical detection result. In some embodiments, the region R1 (not shown) is slightly larger than the portion P1 overlapping to ensure that the light emitted from the optical unit 120 can fully pass through the region R1 (not shown). For example, if the area of the portion P1 is 1 square centimeter, the area of the region R1 (not shown) may be set slightly more than 1 square centimeter, such as 1.5 square centimeters.

In operation S350, the processing unit 140 controls the portion P1 (or the region R1) of the see-through display unit 110 to be transparent while capturing the first optical detection result. In this operation, as shown in FIG. 4B, the portion P1 becomes transparent and the optical unit 120 can be executed without interfered with the display contents IMG1.

In some embodiments, the processing unit 140 controls the portion P1 (or the region R1) of the see-through display unit 110 to be transparent for a time period TP1 when the optical unit 120 is in use, in which the time period TP1 is related to the optical unit 120. In some embodiments, the time period TP1 is related to a time length of a processing time of the optical unit 120. In some embodiments, the time period TP1 is equal to or longer than a time length of capturing an image to ensure that the light emitted from the optical unit 120 will not be affected by the display contents IMG1 on the see-through display unit 110. For example, if the processing time of the optical unit 120 is 1/30 seconds, the time period TP1 is set to be 7/30 seconds.

In operation S360, the processing unit 140 determines a portion P2 on the see-through display unit 110 according to the optical path OP2 (as shown in FIG. 2B) in response to the optical unit 130 is triggered to capture the second optical detection result (e.g., a light strength). Since the details of operation S360 are similar to operation S340, those will not be discussed further herein.

In operation S370, the processing unit 140 controls the portion P2 of the see-through display unit 110 to be transparent while capturing the second optical detection result. In some embodiments, the processing unit 140 controls the portion P2 of the see-through display unit 110 to be transparent for a time period TP2 when the optical unit 130 is in use, in which the time period TP2 is related to the optical unit 130. In some embodiments, the time period TP2 is equal to or longer than a time length of detecting the light strength to ensure that the light received by the optical unit 130 will not be affected by the display contents IMG1 on the see-through display unit 110.

Figure 5:
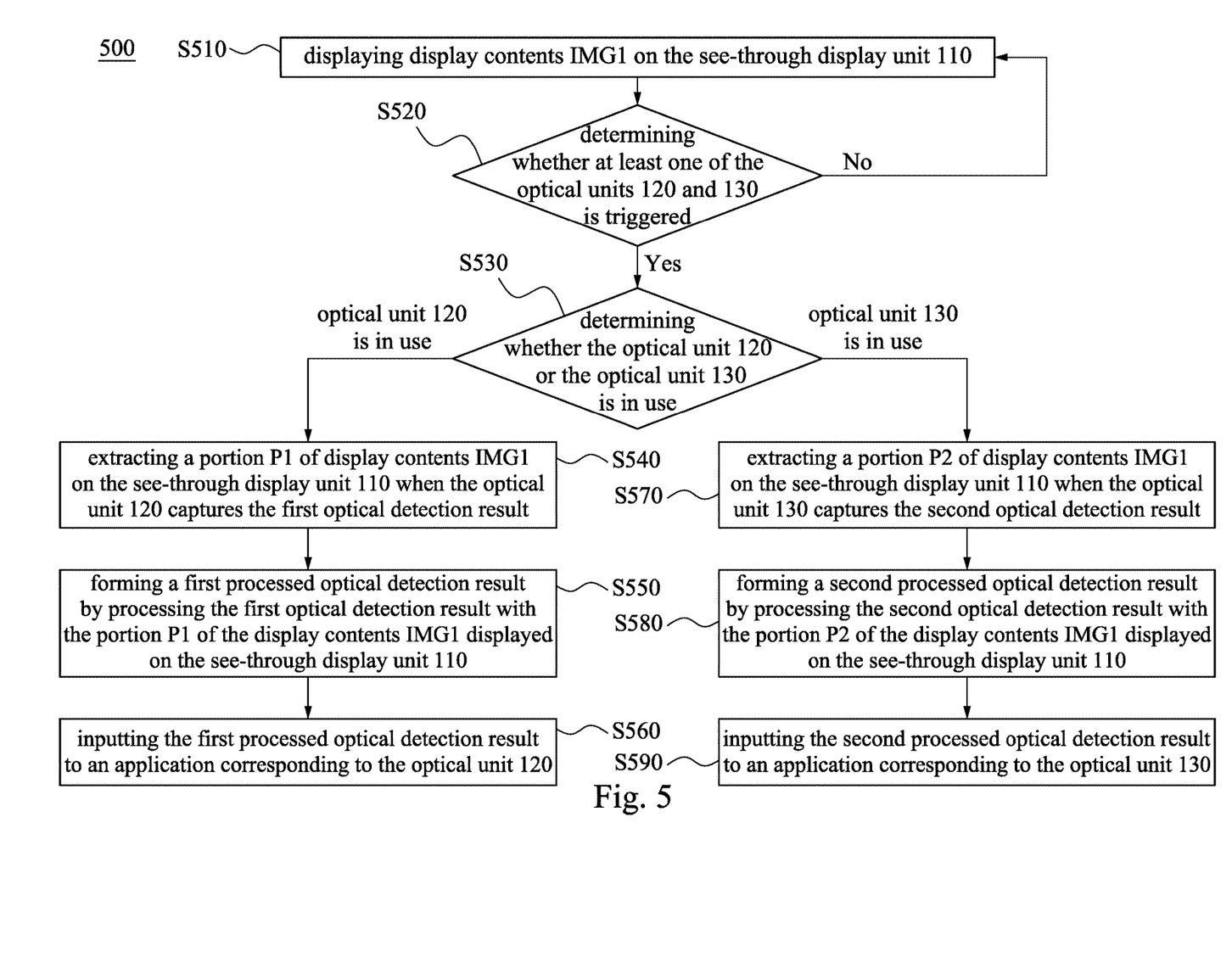
FIG. 5 is a flowchart of an image processing method of the mobile device in FIG. 1, in accordance with one embodiment of the present disclosure.

Details of the present disclosure are described in the paragraphs below with reference to an image processing method in FIG. 5, in which FIG. 5 is a flowchart of an image processing method 500 of the mobile device 100 in FIG. 1, in accordance with one embodiment of the present disclosure. However, the present disclosure is not limited to the embodiment below.

Figure 6A:
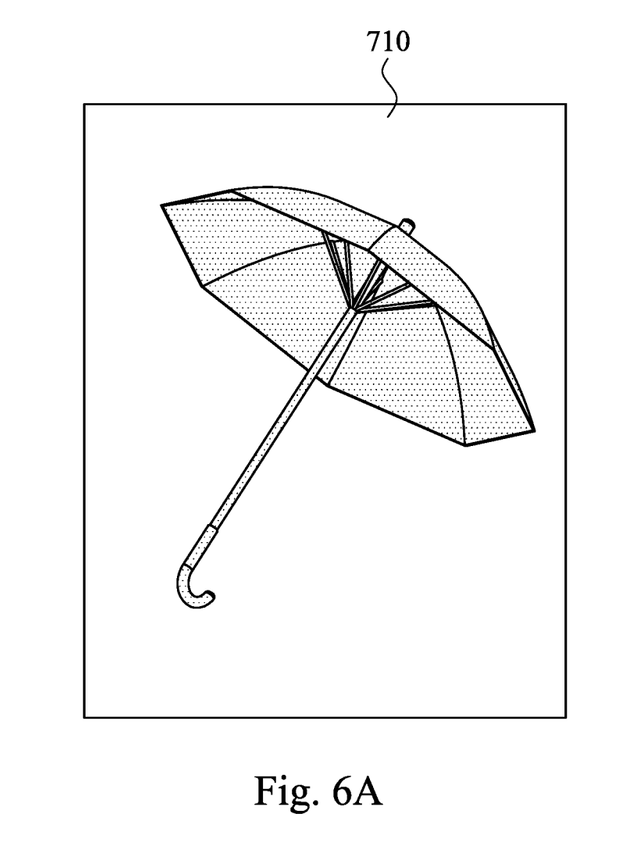
FIGS. 6A and 6B are schematic diagrams illustrating the image processing method in FIG. 5 in a demonstrational example.
Figure 6B:
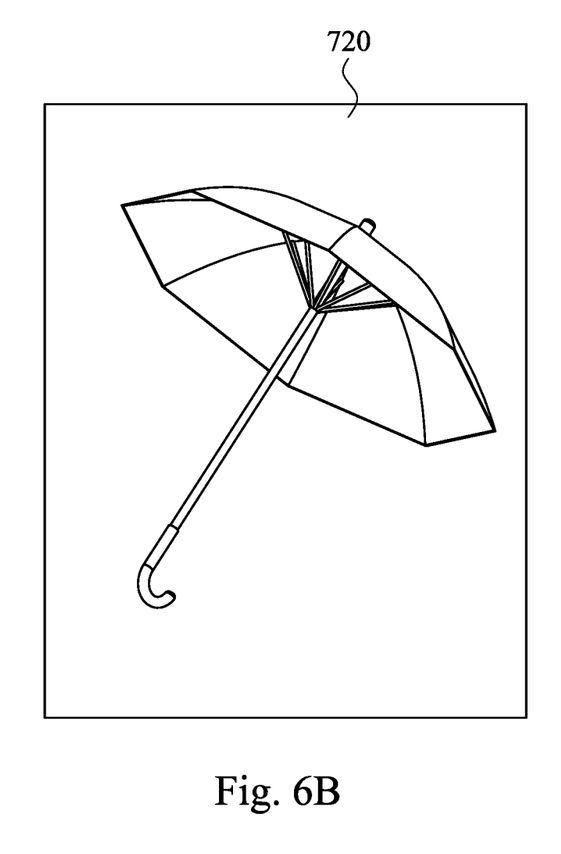

Reference is made to FIGS. 1, 5, 6A and 6B, in which FIGS. 6A and 6B are schematic diagrams illustrating the image processing method 500 in FIG. 5 in a demonstrational example. In the following embodiment, the optical unit 120 is assumed as a camera unit, and the optical unit 130 is assumed as a proximity sensor. The image processing method 500 includes the operations below.

In some embodiments, the image processing method 500 is performed by the mobile device 100 such that the processing unit 140 can generate a processed image the same as which captured by the optical units being arranged in front of the see-through display unit 110. Reference is also made to FIGS. 6A and 6B, in which FIGS. 6A and 6B are schematic diagrams illustrating the image processing method 500 in FIG. 5 in a demonstrational example.

In operation S510, the see-through display unit 110 displays display contents IMG1.

In operation S520, the processing unit 140 determines whether at least one of the optical units 120 and 130 is triggered. In this embodiment, the processing unit 140 monitors the operational status of the mobile device 100, in which the operational status indicating whether the optical unit 120/130 is triggered to capture the optical detection result.

In operation S530, the processing unit 140 determines whether the optical unit 120 or the optical unit 130 is in use. If the processing unit 140 determines that the optical unit 120 is in use, operation S540 is executed. If the processing unit 140 determines that the optical unit 130 is in use, operation S570 is executed. If both the optical units 120 and 130 are in use, operation S540 and operation S570 are executed simultaneously.

In operation S540, the processing unit 140 extracts a portion P1 of display contents IMG1 on the see-through display unit 110 when the optical unit 120 captures the first optical detection result. In some embodiments, the processing unit 140 determines the portion P1 on the see-through display unit 110 according to the optical path OP1 (as shown in FIG. 2B) in response to the optical unit 120 is triggered to capture the first optical detection result (e.g., an image).

In operation S550, the processing unit 140 forms a first processed optical detection result by processing the first optical detection result with the portion P1 of the display contents IMG1 displayed on the see-through display unit 110.

In some embodiments, the processing unit 140 adjusts the first optical detection result according to the display contents IMG1 within the portion P1 on the see-through display unit 110.

Figure 7:
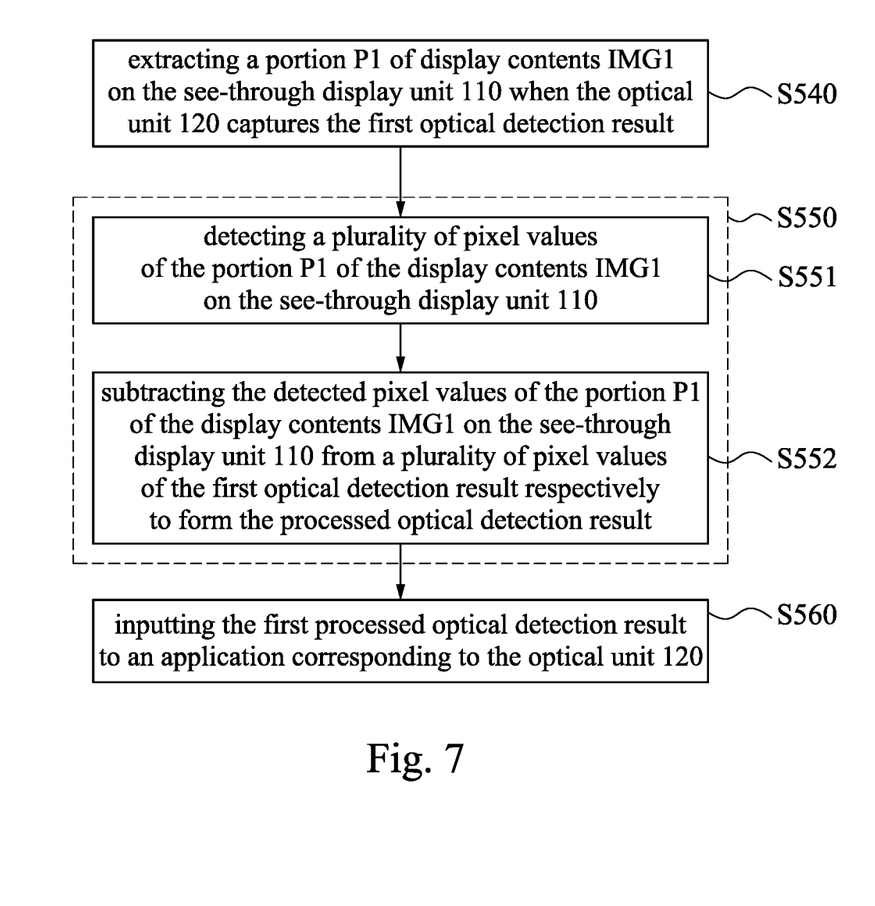
FIG. 7 is a partial flowchart of an image processing method in FIG. 5, in accordance with one embodiment of the present disclosure.

In some embodiments, operation S550 further contains detail operations S551 and S552 as shown in FIG. 7, in which FIG. 7 is a partial flowchart of an image processing method 500 in FIG. 5, in accordance with one embodiment of the present disclosure.

In operations S551, the processing unit 140 detects a plurality of pixel values of the portion P1 of the display contents IMG1 on the see-through display unit 110. In this operation, the reason why the processing unit 140 detects the pixel values of the portion P1 is to measure the impact of the display contents IMG1 on the image captured by the camera.

In operation S552, the processing unit 140 subtracts the detected pixel values of the portion P1 of the display contents IMG1 on the see-through display unit 110 from the plurality of pixel values of the first optical detection result 710 (as shown in FIG. 6A) respectively to form the first processed optical detection result 720 (as shown in FIG. 6B). In some embodiments, the processing unit 140 processes the plurality of pixel values of the first optical detection result 710 by an image processing method according to the detected pixel values of the portion P1 of the display contents IMG1 on the see-through display unit 110 to form the first processed optical detection result 720. In detail, the first processed optical detection result 720 is an image captured by the optical unit 120 without affecting by the display contents IMG1 on the see-through display unit 110.

In operation S560, the processing unit 140 inputs the first processed optical detection result 720 to an application corresponding to the optical unit 120. For example, the processing unit 140 transmits the first processed optical detection result 720 to the application corresponding to the optical unit 120 for revealing the first processed optical detection result 720 on the see-through display unit 110.

In operation S570, the processing unit 140 extracts a portion P2 of display contents IMG1 on the see-through display unit 110 when the optical unit 120 captures the second optical detection result. In some embodiments, the processing unit 140 determines the portion P2 on the see-through display unit 110 according to the optical path OP2 (as shown in FIG. 2B) in response to the optical unit 120 is triggered to capture the second optical detection result (e.g., a light strength).

In operation S580, the processing unit 140 forms a second processed optical detection result by processing the second optical detection result with the portion P2 of the display contents IMG1 displayed on the see-through display unit 110.

In some embodiments, the processing unit 140 adjusts the second optical detection result according to the display contents IMG1 within the portion P2 on the see-through display unit 110.

Figure 8:
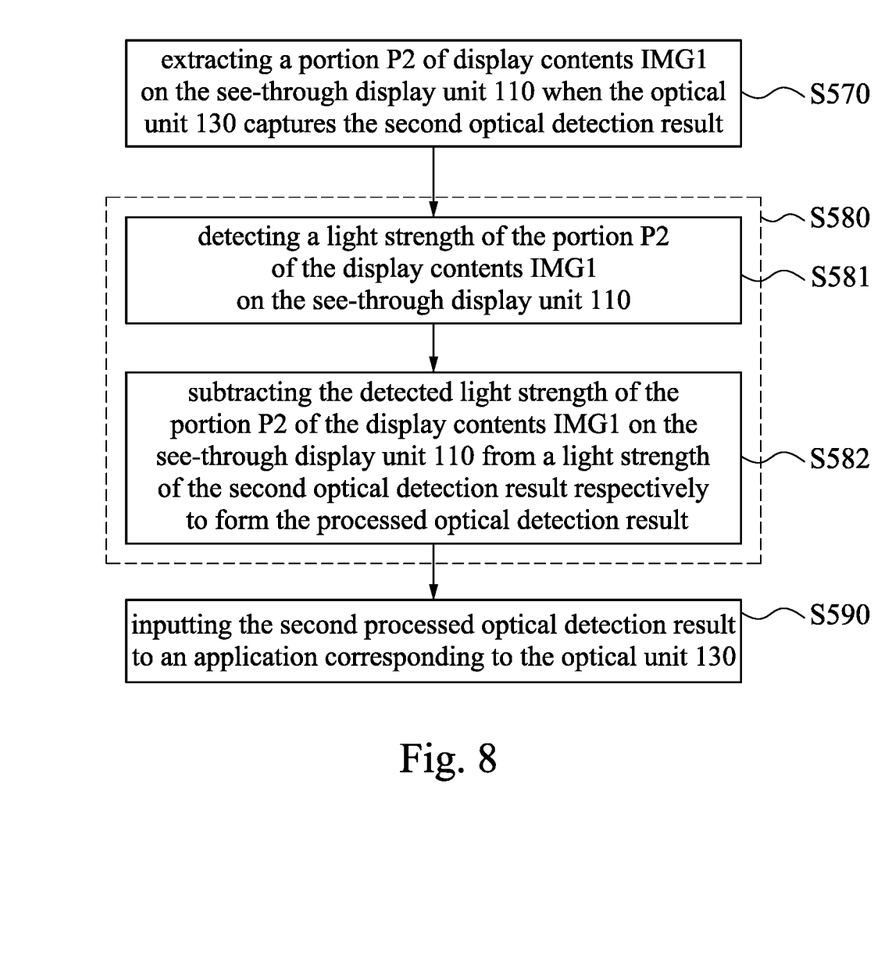
FIG. 8 is a partial flowchart of an image processing method in FIG. 5, in accordance with one embodiment of the present disclosure.

In some embodiments, operation S580 further contains detail operations S581 and S582 as shown in FIG. 8, in which FIG. 8 is a partial flowchart of an image processing method 500 in FIG. 5, in accordance with one embodiment of the present disclosure.

In operation S581, the processing unit 140 detects a light strength of the portion P2 of the display contents IMG1 on the see-through display unit 110. In this operation, the reason why the processing unit 140 detects the light strength generated by the portion P1 is to measure the impact of the display contents IMG1 on the light strength captured by the proximity sensor.

In operation S582, the processing unit 140 subtracts the light strength of the portion P2 of the display contents IMG1 on the see-through display unit 110 from the light strength of the second optical detection result respectively to form the second processed optical detection result. In some embodiments, the processing unit 140 processes the light strength of the second optical detection result by a light processing method according to the detected light strength of the portion P2 of the display contents IMG1 on the see-through display unit 110 to form the second processed optical detection result. In detail, the second processed optical detection result is the light strength captured by the optical unit 130 without affecting by the display contents IMG1 on the see-through display unit 110.

In operation S590, the processing unit 140 inputs the second processed optical detection result to an application corresponding to the optical unit 130. For example, the processing unit 140 transmits the second processed optical detection result to the application corresponding to the optical unit 130 for determining a distance between a user and the mobile device 100.

As a result, through the operations of the embodiments described above, the mobile device can generate images, light strength, and other optical detection results without affecting by the display contents on the see-through display unit.

Although the present invention has been described in considerable detail with reference to certain embodiments thereof, other embodiments are possible. Therefore, the scope of the appended claims should not be limited to the description of the embodiments contained herein.

What is claimed is:
1. A mobile device comprising:
a see-through display unit;
a back cover;
a first optical unit arranged between the see-through display unit and the back cover, and configured to capture a first optical detection result along a first optical path, the first optical path passing through an active region of the see-through display unit; and
a processing unit coupled to the first optical unit and the see-through display unit, wherein the processing unit is configured to:
in response to the first optical unit is triggered to capture the first optical detection result, determine a first portion on the see-through display unit according to the first optical path;
control the first portion of the see-through display unit to be transparent while capturing the first optical detection result or adjusting the first optical detection result according to display contents within the first portion on the see-through display unit;
detect a plurality of pixel values or light strength of the display contents within the first portion on the see-through display unit; and
subtract the detected pixel values or the detected light strength of the display contents within the first portion on the see-through display unit from a plurality of pixel values of the first optical detection result respectively to form a first processed optical detection result.
2. The mobile device as claimed in claim 1, wherein the processing unit is further configured to:

input the adjusted first optical detection result to an application corresponding to the first optical unit.

3. The mobile device as claimed in claim 1, wherein the first processed optical detection result is equal to an optical detection result captured by the first optical unit without being affected by the display contents on the see-through display unit.

4. The mobile device as claimed in claim 1, further comprises:
  a second optical unit arranged between the see-through display unit and the back cover, and configured to capture a second optical detection result along a second optical path, the second optical path passing through the active region of the see-through display unit,
  wherein the processing unit is further configured to:
    in response to the second optical unit is triggered to capture the second optical detection result, determining a second portion on the see-through display unit according to the second optical path; and
    control the second portion of the see-through display unit to be transparent while capturing the second optical detection result or adjusting the second optical detection result according to display contents within the second portion on the see-through display unit.

5. The mobile device as claimed in claim 1, wherein the processing unit further configured to:
  control the first portion of the see-through display unit to be transparent for a first time period when the first optical unit is in use, wherein the first time period is related to the first optical unit.

6. The mobile device as claimed in claim 5, wherein the first time period is equal to or longer than a time length of capturing an image, examining a light strength and detecting an infrared light by the first optical unit.

7. The mobile device as claimed in claim 5, wherein an area of the first portion of the see-through display unit is equal to or longer than an area of the first optical unit.

8. An image processing method, suitable for a mobile device comprising a see-through display unit and a first optical unit arranged behind the see-through display unit and configured to generate a first optical detection result along a first optical path through the see-through display unit, the image processing method comprising:
  extracting a first portion of display contents on the see-through display unit when the first optical unit captures the first optical detection result;
  forming a first processed optical detection result by processing the first optical detection result with the first portion of the display contents displayed on the see-through display unit; and
  inputting the first processed optical detection result to an application corresponding to the first optical unit;
  wherein the step of forming the first processed optical detection result by processing the first optical detection result with the first portion of the display contents displayed on the see-through display unit comprises:
    detecting a plurality of pixel values or a light strength of the first portion of the display contents on the see-through display unit; and
    subtracting the detected pixel values or the detected light strength of the first portion of the display contents on the see-through display unit from a plurality of pixel values of the first optical detection result respectively to form the first processed optical detection result.

9. The image processing method as claimed in claim 8, wherein the first processed optical detection result is equal to an optical detection result captured by the first optical unit without being affected by the display contents on the see-through display unit.

10. The image processing method as claimed in claim 8, wherein the first optical unit comprises a proximity sensor, a camera, a structure light transmitter, a structure light receiver and an ambient light sensor.

11. The image processing method as claimed in claim 8, wherein the mobile device further comprises a second optical unit arranged behind the see-through display unit and configured to generate a third optical detection result along a second optical path through the see-through display unit, the image processing method further comprises:
  extracting a second portion of the display contents on the see-through display unit when the second optical unit captures the third optical detection result;
  forming a fourth optical detection result by processing the third optical detection result with the second portion of the display contents displayed on the see-through display unit; and
  inputting the fourth optical detection result to an application corresponding to the second optical unit.

12. An image processing method, suitable for a mobile device comprising a see-through display unit, a first optical unit arranged behind the see-through display unit and configured to generate a first optical detection result along a first optical path through the see-through display unit, and a second optical unit arranged behind the see-through display unit and configured to generate a third optical detection result along a second optical path through the see-through display unit, the image processing method comprising:
  displaying display contents on the see-through display unit;
  in response to the first optical unit is triggered to capture the first optical detection result, determining a first portion on the see-through display unit according to the first optical path;
  controlling the first portion of the see-through display unit to be transparent while capturing the first optical detection result;
  determining whether the first optical unit captures the first optical detection result or the second optical unit captures the third optical detection result;
  in response to the first optical unit receives the first optical detection result, controlling the first portion of the see-through display unit to be transparent, and
  in response to the second optical unit receives a second optical detection result, controlling a second portion of the see-through display unit to be transparent.

13. The image processing method as claimed in claim 12, further comprising:
  controlling the first portion of the see-through display unit to be transparent for a first time period when the first optical unit is in use, wherein the first time period is related to the first optical unit.

14. The image processing method as claimed in claim 13, wherein the first time period is equal to or longer than a time length of capturing an image, examining a light strength and detecting an infrared light by the first optical unit.

15. The image processing method as claimed in claim 13, wherein an area of the first portion of the see-through display unit is equal to or larger than an area of the first optical unit.

* * * * *